(12) United States Patent
Pope et al.

(10) Patent No.: US 9,353,309 B2
(45) Date of Patent: *May 31, 2016

(54) METHOD FOR TREATING A FORMATION WITH A SOLVENT

(75) Inventors: Gary A. Pope, Cedar Park, TX (US); Jimmie R. Baran, Jr., Prescott, WI (US); John D. Skildum, North Oaks, MN (US); Vishal Bang, Houston, TX (US); Mukul M. Shama, Austin, TX (US)

(73) Assignees: BOARD OF REGENTS, THE UNIVERSITY OF TEXAS SYSTEM, Austin, TX (US); 3M INNOVATIVE PROPERTIES COMPANY, St. Paul, MN (US)

( * ) Notice: Subject to any disclaimer, the term of this patent is extended or adjusted under 35 U.S.C. 154(b) by 1563 days.

This patent is subject to a terminal disclaimer.

(21) Appl. No.: 12/532,684

(22) PCT Filed: Dec. 30, 2007

(86) PCT No.: PCT/US2007/089184
§ 371 (c)(1),
(2), (4) Date: Mar. 1, 2010

(87) PCT Pub. No.: WO2008/118243
PCT Pub. Date: Oct. 2, 2008

(65) Prior Publication Data
US 2010/0152071 A1 Jun. 17, 2010

Related U.S. Application Data

(60) Provisional application No. 60/896,886, filed on Mar. 23, 2007.

(51) Int. Cl.
*C09K 8/62* (2006.01)
*C09K 8/86* (2006.01)

(52) U.S. Cl.
CPC .................................... *C09K 8/86* (2013.01)

(58) Field of Classification Search
None
See application file for complete search history.

(56) References Cited

U.S. PATENT DOCUMENTS

| | | | |
|---|---|---|---|
| 2,732,398 A | 1/1956 | Brice et al. | |
| 2,803,615 A | 8/1957 | Ahlbrecht et al. | |

(Continued)

FOREIGN PATENT DOCUMENTS

| | | |
|---|---|---|
| CA | 2009732 | 8/1990 |
| CN | 1064729 A | 9/1992 |

(Continued)

OTHER PUBLICATIONS

US 6,492,477, 12/2002, Savu, et al. (withdrawn).

(Continued)

*Primary Examiner* — John J Figueroa
(74) *Attorney, Agent, or Firm* — Edwin S. Flores; Daniel J. Chalker; Chalker Flores, LLP

(57) ABSTRACT

The present invention includes compositions and methods for treating a hydrocarbon-bearing formation by contacting the hydrocarbon-bearing formation with a fluid that includes at least one of a polyol or polyol ether, wherein the polyol and polyol ether independently have from 2 to 25 carbon atoms; and at least one of a monohydroxy alcohol, ether, or ketone, wherein the monohydroxy alcohol, ether, and ketone independently have from 1 to 4 carbon atoms, and wherein the at least one of a polyol or polyol ether is present in the fluid at at least 50 weight percent, based on the total weight of the fluid.

19 Claims, 2 Drawing Sheets

(56) References Cited

U.S. PATENT DOCUMENTS

| | | | |
|---|---|---|---|
| 3,100,524 A | 8/1963 | Beeson | |
| 3,311,167 A | 3/1967 | O'Brien et al. | |
| 3,394,758 A * | 7/1968 | Terry | B60C 3/08 166/292 |
| 3,554,288 A | 1/1971 | Ross | |
| 3,653,442 A | 4/1972 | Ross | |
| 3,787,351 A | 1/1974 | Olson | |
| 3,882,029 A | 5/1975 | Fischer et al. | |
| 3,902,557 A | 9/1975 | Shaughnessy et al. | |
| 4,018,689 A | 4/1977 | Thompson | |
| 4,085,799 A | 4/1978 | Bousaid et al. | |
| 4,200,154 A | 4/1980 | Tate | |
| 4,329,236 A | 5/1982 | Alford et al. | |
| 4,409,110 A | 10/1983 | Borchardt et al. | |
| 4,432,882 A | 2/1984 | Raynolds et al. | |
| 4,440,653 A | 4/1984 | Brisco et al. | |
| 4,460,791 A | 7/1984 | Cooke | |
| 4,557,837 A | 12/1985 | Ckark, III et al. | |
| 4,565,639 A | 1/1986 | Penny et al. | |
| 4,596,662 A | 6/1986 | Walker et al. | |
| 4,609,043 A | 9/1986 | Cullick | |
| 4,609,477 A | 9/1986 | Crema | |
| 4,702,849 A | 10/1987 | Penny | |
| 4,753,740 A * | 6/1988 | Marlett | C01D 3/04 134/41 |
| 4,767,545 A | 8/1988 | Karydas et al. | |
| 4,817,715 A | 4/1989 | Peru | |
| 4,823,873 A | 4/1989 | Karydas | |
| 4,921,619 A | 5/1990 | Karydas | |
| 4,923,009 A | 5/1990 | Watkins | |
| 4,975,468 A | 12/1990 | Yiv | |
| 4,993,448 A | 2/1991 | Karydas et al. | |
| 4,997,580 A | 3/1991 | Karydas et al. | |
| 5,038,864 A | 8/1991 | Dunleavy et al. | |
| 5,042,580 A | 8/1991 | Cullick et al. | |
| 5,092,405 A | 3/1992 | Prukop | |
| 5,129,457 A * | 7/1992 | Sydansk | E21B 43/168 166/268 |
| 5,143,958 A | 9/1992 | Lockhart et al. | |
| 5,169,559 A | 12/1992 | Naae et al. | |
| 5,181,568 A | 1/1993 | McKown et al. | |
| 5,186,257 A | 2/1993 | Stahl et al. | |
| 5,219,476 A | 6/1993 | Lockhart et al. | |
| 5,247,993 A | 9/1993 | Sarem et al. | |
| 5,310,002 A | 5/1994 | Blauch et al. | |
| 5,325,922 A * | 7/1994 | Cowan et al. | 166/293 |
| 5,338,465 A | 8/1994 | Lockhart et al. | |
| 5,358,052 A | 10/1994 | Gidley | |
| 5,370,919 A | 12/1994 | Fieuws et al. | |
| 5,415,229 A | 5/1995 | Sydansk | |
| 5,423,379 A * | 6/1995 | Hale et al. | 166/293 |
| 5,477,924 A | 12/1995 | Pollack | |
| 5,733,526 A | 3/1998 | Trevino et al. | |
| 5,823,262 A | 10/1998 | Dutton | |
| 5,965,659 A | 10/1999 | Kubo et al. | |
| 6,113,919 A | 9/2000 | Reiss et al. | |
| 6,127,430 A | 10/2000 | Baran, Jr. et al. | |
| 6,165,948 A | 12/2000 | Dewenter et al. | |
| 6,206,102 B1 | 3/2001 | Pusch et al. | |
| 6,225,263 B1 * | 5/2001 | Collins | C09K 8/58 166/295 |
| 6,274,060 B1 | 8/2001 | Sakashita et al. | |
| 6,443,230 B1 | 9/2002 | Boles et al. | |
| 6,576,597 B2 | 6/2003 | Dobson, Jr. et al. | |
| 6,579,572 B2 | 6/2003 | Espin et al. | |
| 6,635,604 B1 * | 10/2003 | Halliday et al. | 507/136 |
| 6,660,693 B2 | 12/2003 | Miller et al. | |
| 6,664,354 B2 * | 12/2003 | Savu | B01F 17/0035 526/243 |
| 6,689,854 B2 | 2/2004 | Fan et al. | |
| 6,729,409 B1 | 5/2004 | Gupta et al. | |
| 6,767,869 B2 | 7/2004 | DiLullo et al. | |
| 6,790,870 B1 | 9/2004 | Desimone et al. | |
| 6,805,198 B2 | 10/2004 | Huang et al. | |
| 6,852,781 B2 | 2/2005 | Savu et al. | |
| 6,911,417 B2 | 6/2005 | Chan et al. | |
| 6,920,928 B1 | 7/2005 | Davies et al. | |
| 6,945,327 B2 | 9/2005 | Ely et al. | |
| 6,972,274 B1 | 12/2005 | Slikta et al. | |
| 7,072,809 B2 * | 7/2006 | Egermann | G01N 15/08 702/12 |
| 7,084,094 B2 | 8/2006 | Gunn et al. | |
| 7,132,456 B2 | 11/2006 | Gillig et al. | |
| 7,165,613 B2 | 1/2007 | Chan et al. | |
| 7,199,197 B2 | 4/2007 | Caldwell et al. | |
| 7,256,160 B2 | 8/2007 | Crews | |
| 7,417,099 B2 | 8/2008 | Savu et al. | |
| 7,585,817 B2 | 9/2009 | Pope et al. | |
| 7,727,710 B2 | 6/2010 | Haddad et al. | |
| 7,772,162 B2 | 8/2010 | Pope et al. | |
| 7,855,167 B2 | 12/2010 | Michnick et al. | |
| 8,043,998 B2 | 10/2011 | Pope et al. | |
| 8,138,127 B2 | 3/2012 | Pope et al. | |
| 8,261,825 B2 | 9/2012 | Pope et al. | |
| 8,403,050 B2 * | 3/2013 | Pope et al. | 166/300 |
| 8,701,763 B2 * | 4/2014 | Baran et al. | 166/263 |
| 2001/0016562 A1 | 8/2001 | Muir et al. | |
| 2001/0036905 A1 | 11/2001 | Parlar et al. | |
| 2002/0028750 A1 | 3/2002 | Dobson, Jr. et al. | |
| 2002/0173915 A1 | 11/2002 | Egermann et al. | |
| 2002/0189810 A1 | 12/2002 | DiLullo et al. | |
| 2003/0083448 A1 | 5/2003 | Fan et al. | |
| 2003/0092581 A1 | 5/2003 | Crews | |
| 2003/0092584 A1 * | 5/2003 | Crews | 507/200 |
| 2003/0109385 A1 * | 6/2003 | Gunn | C09K 8/512 507/200 |
| 2003/0114315 A1 * | 6/2003 | Schwartz | B08B 9/0555 507/121 |
| 2003/0139549 A1 | 7/2003 | Savu et al. | |
| 2004/0186254 A1 | 9/2004 | Fan et al. | |
| 2005/0142563 A1 | 6/2005 | Haddad et al. | |
| 2005/0148491 A1 | 7/2005 | Savu et al. | |
| 2005/0245401 A1 | 11/2005 | Chan et al. | |
| 2006/0052449 A1 | 3/2006 | Gillig et al. | |
| 2006/0116296 A1 | 6/2006 | Kippie et al. | |
| 2006/0264334 A1 | 11/2006 | Gupta et al. | |
| 2007/0015669 A1 | 1/2007 | Zhang | |
| 2007/0029085 A1 | 2/2007 | Panga et al. | |
| 2007/0123430 A1 | 5/2007 | Pasquier et al. | |
| 2007/0225176 A1 | 9/2007 | Pope et al. | |
| 2008/0047706 A1 | 2/2008 | Pope et al. | |
| 2008/0051300 A1 | 2/2008 | Pope et al. | |
| 2008/0051551 A1 | 2/2008 | Pope et al. | |
| 2010/0137169 A1 | 6/2010 | Pope et al. | |
| 2010/0167964 A1 | 7/2010 | Pope et al. | |
| 2010/0181068 A1 | 7/2010 | Pope et al. | |
| 2010/0224361 A1 | 9/2010 | Pope et al. | |
| 2010/0270019 A1 | 10/2010 | Pope et al. | |
| 2010/0276149 A1 | 11/2010 | Pope et al. | |
| 2010/0307831 A1 | 12/2010 | Pasquier et al. | |

FOREIGN PATENT DOCUMENTS

| | | |
|---|---|---|
| CN | 1394935 A | 2/2003 |
| CN | 1528854 A | 9/2004 |
| CN | 1696241 A | 11/2005 |
| EP | 1 999 339 | 12/2008 |
| EP | 2 054 485 | 5/2009 |
| EP | 2 132 240 A1 | 12/2009 |
| JP | 3-219248 | 9/1991 |
| JP | 7-101803 | 4/1995 |
| JP | 8-193021 | 7/1996 |
| RU | 2066744 C1 | 9/1996 |
| RU | 2164291 | 3/2001 |
| WO | 9802636 A1 | 1/1998 |
| WO | 03089540 A1 | 10/2003 |
| WO | 2005/028589 A1 | 3/2005 |
| WO | 2005/035936 A1 | 4/2005 |
| WO | 2005/100007 A2 | 10/2005 |
| WO | 2006/028608 A1 | 3/2006 |
| WO | 2007/076562 A1 | 7/2007 |
| WO | 2007/097975 A2 | 8/2007 |
| WO | 2007/097978 A1 | 8/2007 |
| WO | 2007126431 A1 | 11/2007 |

(56) References Cited

FOREIGN PATENT DOCUMENTS

| WO | 2008/024865 A1 | 2/2008 |
|---|---|---|
| WO | 2008/024868 A1 | 2/2008 |
| WO | 2008/118239 A2 | 10/2008 |
| WO | 2008/118241 A1 | 10/2008 |
| WO | 2008/118244 A1 | 10/2008 |
| WO | 2008118240 A1 | 10/2008 |
| WO | 2008118242 A1 | 10/2008 |
| WO | 2008118243 | 10/2008 |
| WO | 2009/073484 | 6/2009 |
| WO | 2009/085936 A1 | 7/2009 |

OTHER PUBLICATIONS

Adibhatla, B., et al., "Effect of surfactants on wettability of near-wellbore regions of gas reservoirs," J Petr Sci Engr (2006), 52:227-236.
Al-Anazi et al., "Laboratory Measurements of Condensate Blocking and Treatment for Both Low and High Permeability Rocks", 2002, SPE 77546, Society of Petroleum Engineers Inc., pp. 1-9.
Al-Anazi et al., "A Successful Methanol Treatment in a Gas-Condensate Reservoir: Field Application", Mar. 2003, SPE 80901, Society of Petroleum Engineers Inc., pp. 1-9.
Al-Anazi, "Experimental Measurements of Condensate Blocking and Treatments in Low and High Permeability Cores" (Thesis), Dec. 2003, pp. 1-474.
Ayyalasomayajula et al., "Phase Behavior Modeling of Hydrocarbon-Methanol-Water Mixtures by Peng-Robinson and SAFT Equations of State", Sep. 2002, SPE 77575, Society of Petroleum Engineers Inc., pp. 1-8.
Ayyalasomayajula, "Prediction of Bulk and Interfacial Thermodynamic Properties of Polar Mixtures by Statistical Associating Fluid Theory" (Thesis), May 2003, pp. 1-268.
Bang, "Phase Behavior Study of Hydrocarbon-Water-Alcohol Mixtures" (Thesis) May 2005, pp. 1-138.
Chowdhury, "Reservoir Simulation of Asphaltene Precipitation and of Gas Condensates" (Thesis), Dec. 2003, pp. 1-227.
Chowdhury et al., "A Semi-Analytical Method to Predict Well Deliverability in Gas-Condensate Reservoirs", Sep. 2004, SPE 90320, Society of Petroleum Engineers Inc., pp. 1-13.
Crema et al., "Foaming of Anhydrous Methanol for Well Stimulation", Apr. 1985, SPE 13565, Society of Petroleum Engineers Inc., 4 pages.
Du et al., "Use of Solvents to Improve the Productivity of gas Condensate Wells", Oct. 2000, SPE 62935, Society of Petroleum Engineers Inc., pp. 1-8.
Fahes et al., "Wettability Alteration to Intermediate Gas-Wetting in Gas-Condensate Reservoirs at High Temperatures", Oct. 2005, SPE 96184, Society of Petroleum Engineers Inc., pp. 1-14.
Gadde et al., "Modeling Proppant Settling in Water-Fracs", Sep. 2004, SPE 89875, Society of Petroleum Engineers Inc., pp. 1-10.
International Search Report and Written Opinion for PCT/US2007/076562 dated Sep. 29, 2008.
Kumar, "A Simulation Study of Carbon Sequestration in Deep Saline Aquifers" (Thesis), Aug. 2004, pp. 1-192.
Lee, "Phase Equilibria in Systems Containing Hydrocarbon, Water and Methanol" (Thesis), May 2003, pp. 1-92.
Li, K. et al., "Experimental Study of Wettability Alteration to Preferential Gass-Wetting in Porous Media and Its Effects," SPE Reservoir Eval and Eng (2000), 3:139-149.
Mahadevan et al., "Clean-up of Water Blocks in Low Permeability Formations", Oct. 2003, SPE 84216, Society of Petroleum Engineers Inc., pp. 1-8.
Mahadevan et al., "Evaporative Clean-up of Water-Blocks in Gas Wells", Apr. 2005, SPE 94215, Society of Petroleum Engineers Inc., pp. 1-11.
Narayanaswamy et al., "Effect of Heterogeneity on the Non-Darcy Flow Coefficient", Mar. 1998, SPE 39979, Society of Petroleum Engineers Inc., pp. 1-17.

Nasr-El-Din et al., "Surface tension of HCI-based stimulation fluids at high temperatures", Jun. 2004, Journal of Petroleum Science and Engineering, vol. 43(1-2), pp. 57-73.
Ortiz et al., "Low-pH methanol: an alternative for stimulation in water-sensitive, tight, dirty sandstones", 1986, SPE Production Engineering (0885-9221), vol. 1(3). pp. 195-202.
Parekh et al., "Cleanup of Water Blocks in Depleted Low-Permeability Reservoirs", Sep. 2004, SPE 89837, Society of Petroleum Engineers Inc., pp. 1-12.
Pope et al., "Modeling Relative Permeability Effects in Gas-Condensate Reservoirs using a New Trapping Model", Sep. 1998, SPE 49266, Society of Petroleum Engineers Inc., pp. 1-8.
Product Information: 3M™ Novec Fluorosurfactant FC-4430, Oct. 2005, 6 pages.
Product Information: 3M™ Novec Fluorosurfactant FC 4432, Oct. 2005, 6 pages.
Product Information: 3M™ Novec Fluorosurfactant FC 4434, Jan. 2005, 4 pages.
Rai, "Parametric Study of Relative Permeability Effects on Gas-Condensate core Floods and Wells" (Thesis), Dec. 2003, pp. 1-319.
Sharma, "Modeling Gas Condensate Reservoirs and Development of a New Hybrid Well Model" (Thesis), May 2003, pp. 1-231.
Sharma et al., "Slick Water and Hybrid Fracs in the Bossier: Some Lessons Learnt", Sep. 2004, SPE 89876, Society of Petroleum Engineers Inc., pp. 1-12.
Tang, G-Q., et al., "Relative Permeability Modification in Gas-Liquid Systems Through Wettability Alteration to Intermediate Gas-Wetting," Oct. 2000, SPE 62934, Society of Petroleum Engineers Inc., pp. 1-15.
U.S. Department of Energy, "Comments on the Outlook for Balancing Natural Gas Supply and Demand, EPAct Section 1818: Natural Gas Shortage Report," http://www.fossil.energy.gov/epact/Section_1818/comments.html, accessed Mar. 16, 2008.
Wu et al., "Modeling Non-Equilibrium Mass Transfer Effects for a Gas Condensate Field", Mar. 1998, SPE 39764, Society for Petroleum Engineers Inc., pp. 1-16.
Extended European Search Report for EP 07 87 0115 dated Aug. 5, 2010.
Extended European Search Report for Application No. 07870114.1, dated Dec. 13, 2011, 10 pages.
Supplementary European Search Report for EP 07870113.3 dated Feb. 9, 2010.
(Supplementary) Extended European Search Report for EP 07870110 (PCT/US2007/089180) dated Jul. 1, 2011, 9 pp.
Extended European Search Report for EP 07870111 (PCT/US2007/089181) dated Jun. 30, 2011, 8 pp.
(Supplementary) Extended European Search Report for EP 07870112 (PCT/US2007/089182) dated Jul. 1, 2011, 10 pp.
Extended European Search Report for EP 07870113 dated Feb. 9, 2010, 10 pp.
Panga, et al. "Wettability Alteration for Water Block Prevention in High Temperature Gas Wells" SPE Proceedings, XX, XX, No. 100182, Jun. 12, 2006, pp. 1-13, XP002411653.
State Intellectual Property Office of The P.R. China, Novelty Search Report for GCC Application No. 2008/10415 dated Feb. 20, 2012, 10 pp.
United States Patent & Trademark Office (ISA), International Search Report and Written Opinion for PCTUS2006/048887 dated Oct. 10, 2007, 5 pp.
United States Patent & Trademark Office (ISA), International Search Report and Written Opinion for PCTUS2007/089180 dated dated Jun. 11, 2008, 6 pp.
United States Patent & Trademark Office (ISA), International Search Report and Written Opinion for PCTUS2007/089181 dated Jun. 11, 2008, 9 pp.
United States Patent & Trademark Office (ISA), International Search Report and Written Opinion for PCTUS2007/089182 dated Jul. 1, 2008, 11 pp.
United States Patent & Trademark Office (ISA), International Search Report and Written Opinion for PCTUS2007/089183 dated Jun. 12, 2008, 13 pp.

(56) References Cited

OTHER PUBLICATIONS

United States Patent & Trademark Office (ISA), International Search Report and Written Opinion for PCTUS2007/089184 dated Apr. 30, 2008, 7 pp.
United States Patent & Trademark Office (ISA), International Search Report and Written Opinion for PCTUS2007/089185 dated Apr. 30, 2008, 11 pp.
Korean Intellectual Property Office (ISA), International Search Report and Written Opinion for PCTUS2008/084719 dated Jun. 26, 2009, 15 pp.
Machine Translation of Chinese Patent Application Publication No. CN1064729A, 42 pp., 1992.
Machine Translation of Chinese Patent Application Publication No. CN1394935A, 24 pp., 2003.
Machine Translation of Chinese Patent Application Publication No. CN1528854A, 24 pp., 2004.
Machine Translation of Chinese Patent Application Publication No. CN1696241A, 15 pp., 2005.
Machine Translation of Russian Patent Application Publication No. RU 2066744C1, 29 pp., 1996.

* cited by examiner

METHOD FOR TREATING A FORMATION WITH A SOLVENT

CROSS REFERENCE TO RELATED APPLICATIONS

This application is a national stage filing under 35 U.S.C. 371 of PCT/US2007/089184, filed Dec. 30, 2007, which claims priority to U.S. Provisional Application No. 60/896,886, filed Mar. 23, 2007, the disclosure of which is incorporated by reference in its/their entirety herein.

BACKGROUND OF THE INVENTION

It is known in the subterranean well drilling art that in some wells (e.g., some oil and/or gas wells) brine is present in hydrocarbon-bearing geological formations in the vicinity of the wellbore (also known in the art as the "near wellbore region"). The brine may be naturally occurring (e.g., connate water) and/or may be a result of operations conducted on the well.

In the case of some wells (e.g., some gas wells), liquid hydrocarbons (also known in the art as "condensate") can form and accumulate in the near wellbore region. The presence of condensate can cause a large decrease in both the gas and condensate relative permeabilities, and thus the productivity of the well decreases.

The presence of brine and/or gas condensate in a near wellbore region of a hydrocarbon-bearing geological formation can inhibit or stop production of hydrocarbons from the well, and hence is typically undesirable.

Various approaches have been tried for increasing the hydrocarbon production of such wells. One approach, for example, involves a fracturing and propping operation (e.g., prior to, or simultaneously with, a gravel packing operation) to increase the permeability of the hydrocarbon-bearing geological formation adjacent to the wellbore. Chemical treatments (e.g., injection of methanol) have also been used to improve productivity of such oil and/or gas wells. The latter treatments are typically injected into the near wellbore region of a hydrocarbon-bearing geological formation where they interact with the brine and/or condensate to displace and/or dissolve it, thereby facilitating increased hydrocarbon production from the well.

While these approaches have been found useful to increase hydrocarbon production, it may be desirable in some instances, for example, to increase productivity of wells, whether or not they have been fractured, with a treatment that is durable, economical and uses techniques known by the skilled artisan.

SUMMARY OF THE INVENTION

In one aspect, the present invention provides a method of treating a hydrocarbon-bearing formation having at least one first gas permeability, the method comprising:

injecting a fluid into the hydrocarbon-bearing formation, wherein the fluid comprises at least one material from at least two of Group I, Group II, or Group III, wherein:

Group I is a polyol or polyol ether, wherein the polyol and polyol ether independently have from 2 to 25 carbon atoms;

Group II is a monohydroxy alcohol, ether, or ketone, wherein the monohydroxy alcohol, ether, and ketone independently have from 1 to 4 carbon atoms; and Group III is toluene, diesel, heptane, octane, or condensate, wherein the fluid at least one of solubilizes or displaces at least one of brine or condensate in the hydrocarbon-bearing formation, wherein the fluid is free of nonionic polymeric surfactant comprising perfluoroalkylsulfonamido groups, wherein the hydrocarbon-bearing formation has at least one second gas permeability after injecting the fluid into the formation, and wherein the second gas permeability is at least 5 percent (in some embodiments, at least 10, 15, 20, 40, 50, 75, 100, 125 or even at least 150 percent or more) higher than the first gas permeability.

In some embodiments, gas permeability is gas relative permeability. In some embodiments, the fluid comprises at least one of a polyol or polyol ether, wherein the polyol and polyol ether independently have from 2 to 25 carbon atoms. In some embodiments, the polyol or polyol ether is at least one of 2-butoxyethanol, ethylene glycol, propylene glycol, poly (propylene glycol), 1,3-propanediol, 1,8-octanediol, diethylene glycol monomethyl ether, ethylene glycol monobutyl ether, or dipropylene glycol monomethyl ether. In some embodiments, the fluid further comprises at least one monohydroxy alcohol, ether, or ketone, wherein the monohydroxy alcohol, ether, or ketone independently have from 1 to 4 carbon atoms. In some embodiments, the fluid comprises at least one of ethanol or isopropanol. In some embodiments, the fluid at least partially solubilizes brine in the hydrocarbon-bearing formation. In some embodiments, the second gas permeability is at least 10 percent (in some embodiments, at least 10, 15, 20, 40, 50, 75, 100, 125 or even at least 150 percent or more) higher than the first gas permeability.

In some embodiments, the method further comprises obtaining hydrocarbons from a well bore penetrating the hydrocarbon-bearing formation after injecting the fluid. In some embodiments, the hydrocarbon-bearing formation is a clastic formation. In some embodiments, the hydrocarbon-bearing formation is a non-clastic formation. In some embodiments, the fluid is free of organosilicon compounds. In some embodiments, the fluid is essentially free of surfactant.

In one aspect, the present invention provides a method of treating a hydrocarbon-bearing formation, the method comprising contacting the hydrocarbon-bearing formation with a fluid, wherein the fluid comprises:

at least one of a polyol or polyol ether, wherein the polyol and polyol ether independently have from 2 to 25 carbon atoms; and at least one of a monohydroxy alcohol, ether, or ketone, wherein the monohydroxy alcohol, ether, and ketone independently have from 1 to 4 carbon atoms, wherein the fluid is free of nonionic polymeric surfactant comprising perfluoroalkylsulfonamido groups, and wherein the at least one of a polyol or polyol ether is present in the fluid at at least 50 weight percent (in some embodiments, at least 55, 60, 65, 70, 80, 90 percent or more), based on the total weight of the fluid. In some embodiments, the fluid is free of organosilicon compounds. In some embodiments, the fluid is essentially free of surfactant.

In some embodiments, the hydrocarbon-bearing formation has at least one first gas permeability prior to contacting the hydrocarbon-bearing formation with the fluid and at least one second gas permeability after contacting the hydrocarbon-bearing formation with the fluid, and wherein the second gas permeability is at least 5 percent (in some embodiments, at least 10, 15, 20, 40, 50, 75, 100, 150 percent or more) higher than the first gas permeability. In some embodiments, the gas permeability is relative gas permeability. In some embodiments, the hydrocarbon-bearing formation has at least one fracture, the method further comprising contacting the fracture with the fluid. In some embodiments, the fracture has a plurality of proppants therein. In one aspect, the present invention provides a method of treating a hydrocarbon-bearing formation having brine, at least one temperature, and at least one first gas permeability, the brine having at least one composition, the method comprising:

obtaining compatibility information for at least one model brine and at least one model fluid at at least one model temperature, wherein each model brine independently has a composition selected at least partially based on the formation brine composition, wherein each model temperature is independently selected at least partially based on the formation temperature, and wherein each model fluid independently comprises:

at least one of a polyol or polyol ether, wherein the polyol and polyol ether independently have from 2 to 25 carbon atoms; and at least one of a monohydroxy alcohol, ether, or ketone, wherein the monohydroxy alcohol, ether, and ketone independently have from 1 to 4 carbon atoms;

selecting a treatment fluid for treating the hydrocarbon-bearing subterranean formation based at least partially on the compatibility information, wherein the treatment fluid is free of nonionic polymeric surfactant comprising perfluoroalkylsulfonamido groups; and contacting the hydrocarbon-bearing formation with the treatment fluid, wherein when the fluid is contacting the hydrocarbon-bearing formation, the formation has at least one second gas permeability, and wherein the second gas permeability is at least 5 percent (in some embodiments, at least 10, 15, 20, 40, 50, 75, 100, 125 or even at least 150 percent or more) higher than the first gas permeability. In some embodiments, the treatment fluid has the same composition as the at least one model fluid. In some embodiments, the fluid is free of organosilicon compounds. In some embodiments, the fluid is essentially free of surfactant.

In one aspect, the present invention provides a method of treating a hydrocarbon-bearing formation, the method comprising contacting the hydrocarbon-bearing formation with a fluid, wherein the fluid consists essentially (i.e., does not contain any components that materially affect water solubilizing or displacement properties of the fluid under downhole conditions, or that alter or interact with (e.g., preferentially or deleteriously adsorb) the surface of the formation) of at least one of a polyol or polyol ether, wherein the polyol and polyol ether independently have from 2 to 25 carbon atoms; and at least one of a monohydroxy alcohol, ether, or ketone, wherein the monohydroxy alcohol, ether, and ketone independently have from 1 to 4 carbon atoms, and wherein the at least one of a polyol or polyol ether is present in the fluid at at least 50 weight percent, based on the total weight of the fluid.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figures 1, 2:
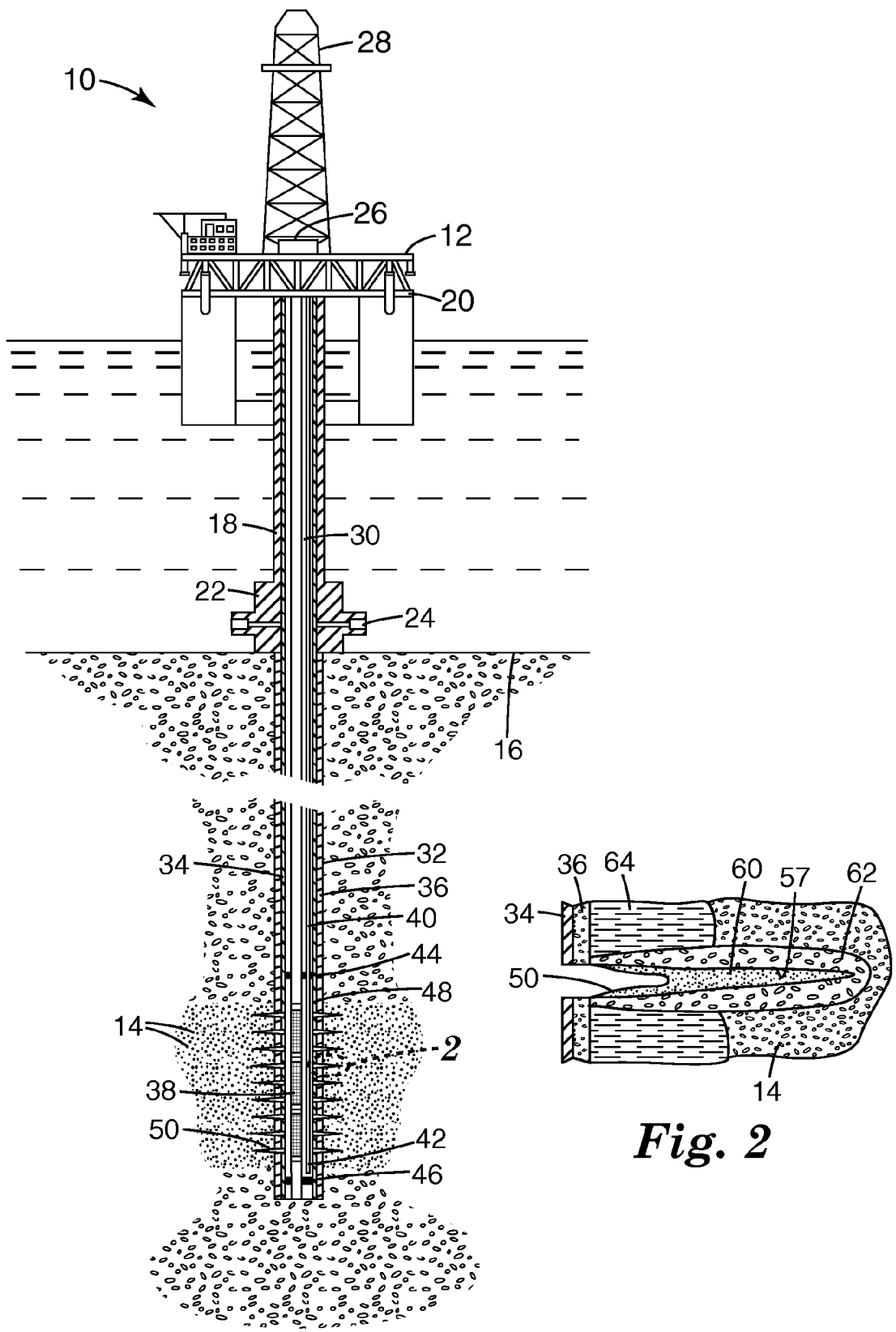
FIG. 1 is a schematic illustration of an exemplary embodiment of an offshore oil and gas platform operating an apparatus for treating a near wellbore region according to the present invention.
FIG. 2 is an expanded view of FIG. 1 that shows the near wellbore region in greater detail for those embodiments related to a fractured formation.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims. The following definitions of terms apply throughout the specification and claims.

The term "brine" refers to water having at least one dissolved electrolyte salt therein (e.g., having any nonzero concentration, and which may be, in some embodiments, less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "brine composition" refers to the types of dissolved electrolytes and their concentrations in brine.

The term "compatibility information" refers to information concerning the phase stability of a solution or dispersion.

The term "downhole conditions" refers to the temperature, pressure, humidity, and other conditions that are commonly found in subterranean formations.

The term "homogeneous" means macroscopically uniform throughout and not prone to spontaneous macroscopic phase separation.

The term "hydrocarbon-bearing formation" includes both hydrocarbon-bearing formations in the field (i.e., subterranean hydrocarbon-bearing formations) and portions of such hydrocarbon-bearing formations (e.g., core samples).

The term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

The term "hydrolyzable silane group" refers to a group having at least one Si—O—Z moiety that undergoes hydrolysis with water at a pH between about 2 and about 12, wherein Z is H or substituted or unsubstituted alkyl or aryl.

The term "nonionic" refers to surfactants being free of ionic groups (e.g., salts) or groups (e.g., —$CO_2H$, —$SO_3H$, —$OSO_3H$, —$P(=O)(OH)_2$) that are readily substantially ionized in water.

The term "normal boiling point" refers to the boiling point at a pressure of one atmosphere (100 kPa).

The term "polymer" refers to a molecule of molecular weight of at least 1000 grams/mole, the structure of which includes the multiple repetition of units derived, actually or conceptually, from molecules of low relative molecular mass.

The term "polymeric" refers to including a polymer.

The term "solvent" refers to a homogenous liquid material (inclusive of any water with which it may be combined) that is capable of at least partially dissolving the nonionic fluorinated polymeric surfactant(s) with which it is combined at 25° C.

The term "water-miscible" means soluble in water in all proportions.

The term "productivity" as applied to a well refers to the capacity of a well to produce hydrocarbons; that is, the ratio of the hydrocarbon flow rate to the pressure drop, where the pressure drop is the difference between the average reservoir pressure and the flowing bottom hole well pressure (i.e., flow per unit of driving force).

In some embodiments of methods according to the present invention, when the fluid is contacting the formation, the formation is essentially free of precipitated salt. As used herein, the term "substantially free of precipitated salt" refers to when the amount of salt in the formation has been reduced, dissolved or displaced in a sufficient amount so that it does not interfere with the productivity of the hydrocarbon-bearing formation. In some instances the amount of precipitated salts may be zero. In one example, substantially free of precipitated salt is an amount of salt that is the less than 5% higher than the solubility product at a given temperature and pressure.

As used herein, the term "essentially free of surfactant" refers to fluid that may have a surfactant in an amount insufficient for the fluid to have a cloud point, e.g., when it is below its critical micelle concentration. A fluid that is essentially free of surfactant may be a fluid that has a surfactant but in an amount insufficient to alter the wettability of, e.g., a hydrocarbon-bearing clastic formation under downhole conditions. A fluid that is essentially free of surfactant includes those that have a weight percent of surfactant as low as 0 weight percent.

Methods according to the present invention are typically useful, for example, for increasing the productivity of oil and/or gas wells that have brine (and optionally condensate) present in the near wellbore region of a hydrocarbon-bearing formation. The brine may be connate or non-connate water, mobile (e.g., crossflow) or immobile (e.g., residual) water, naturally occurring water or water resulting from operations on the formation (e.g., water from aqueous drilling fluids or aqueous fracturing fluids). In some embodiments, the brine is connate water. Applicants have discovered that fluids useful in practicing the present invention typically solubilize or displace brine in hydrocarbon-bearing formations surprisingly more effectively than methanol. The fluids may be useful, for example, when the brine present in the hydrocarbon-bearing formation has a high level of salinity and/or when a high level of water saturation is present in the formation. The fluids described herein may be used to displace or solubilize brine (and optionally condensate) in formations that may or may not have been treated previously with a surfactant (e.g., a nonionic fluorinated polymeric surfactant such as those described in U.S. patent application Ser. No. 11/390,960, filed Mar. 27, 2006, incorporated herein by reference for its disclosure of methods of preparation and formulation of nonionic fluorinated polymeric surfactants).

In some embodiments, the hydrocarbon-bearing formation comprises at least one of a dry gas reservoir, a wet gas reservoir, a retrograde condensate gas reservoir, a tight gas reservoir, a coal-bed gas reservoir or a gas storage reservoir.

In some embodiments, the hydrocarbon-bearing formation has at least one fracture. In some of these embodiments, the fracture has a plurality of proppants therein. Fracture proppant materials are typically introduced into the formation as part of a hydraulic fracture treatment. Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company. In some embodiments, the proppants form packs within a formation and/or wellbore. Proppants may be selected to be chemically compatible with the fluids and compositions described herein. Particulate solids may be introduced into the formation, for example, as part of a hydraulic fracture treatment, sand control particulate introducible into the wellbore/formation as part of a sand control treatment such as a gravel pack or frac pack.

The various model brines and treatment fluids used herein may be prepared by any suitable method including, manually or mechanically shaking and/or stirring the various components thereof. Information concerning the temperature and brine composition of a hydrocarbon-bearing formation is typically obtained by measurement of the pertinent condition(s) in or near a wellbore located at a particular geological zone of interest in a hydrocarbon-bearing formation. Suitable measurement methods are known to the skilled artisan. In some, instances further manipulation of data (e.g., computer calculations) obtained from hydrocarbon-bearing formation may be useful, and such manipulation is within the scope of the present invention.

The compatibility information may be generated by various methods including, computer simulation, physical measurements or a combination thereof. The compatibility information may be as small as a single set element (e.g., a measurement of compatibility between the fluid formulation and the brine and optionally condensate at a given temperature), or it may contain any higher number of set elements. Typically, the choice of fluid formulations and temperatures to be studied and the results included within the compatibility information will be apparent to the skilled artisan performing the method (but this is not a requirement) in light of the present disclosure. In some embodiments, the compatibility information comprises information concerning salt precipitation from a mixture of the model brine and the model treatment fluid.

One convenient method of evaluating compatibility involves combining (e.g., in a container) a model brine and model fluid formulation at a given temperature, and then mixing the model brine and model fluid formulation. The mixture is evaluated over time (e.g., 5 minutes, 1 hour, 12 hours, 24 hours or longer) to see if it phase separates or becomes cloudy or if salt precipitates. By adjusting the relative amounts of model brine and/or model fluid formulation, it is possible to determine the maximum brine displacement capacity (above which phase separation occurs) of the fluid formulation at a given temperature. Varying the temperature at which the above procedure is carried out typically results in a more complete understanding of the suitability of fluid formulations as treatment fluids for a given well. In addition, to calculating and/or measuring interactions of the model brine and model fluid formulation, it is also contemplated that one may be able obtain the compatibility information, in whole or in part, by simply referring to previously determined, collected, and/or tabulated information (e.g., in a handbook or a computer database).

In some embodiments, a treatment fluid is selected based at least in part on the compatibility information thus obtained. In general, a treatment fluid is chosen that closely resembles, or is identical to, a model fluid from the compatibility information set, but this is not a requirement. For example, cost, availability, regulations, flammability, and environmental concerns may influence the specific choice of treatment fluid for use in testing and/or commercial production.

Once selected, the treatment compositions may be further evaluated; for example, by injection into a specimen (e.g., a core sample) taken from a particular geological zone to be treated, or a closely similar specimen. This may be performed in a laboratory environment using conventional techniques such as, for example, those described by Kumar et al. in "Improving the Gas and Condensate Relative Permeability Using Chemical Treatments", paper SPE 100529, presented at the 2006 SPE Gas Technology Symposium held in Calgary, Alberta, Canada, 15-17 May 2006.

In some embodiments, the methods according to the present invention include treating a hydrocarbon-bearing formation that also has condensate, and wherein the fluid at least partially displaces the condensate in the hydrocarbon-bearing formation. The skilled artisan will recognize that the present method may be used both for treating a well but also for testing cores and materials in a laboratory.

The hydrocarbon-bearing formation, including clastic formations, for treatment with the compositions and methods of the present invention may be a gas well that produces at least one of gas, water, gas and water, liquid water, gaseous water, water that condenses at the surface, commingled gas or water coming out of the formation.

In some embodiments, the fluid comprises at least one polyol and/or polyol ether that independently has from 2 to 25 (in some embodiments from 2 to 20 or even from 2 to 10) carbon atoms.

As used herein in referring to the fluid, the term "polyol" refers to an organic molecule consisting of C, H, and O atoms connected one to another by C—H, C—C, C—O, O—H single bonds, and having at least two C—O—H groups. For example, useful polyols may have from 2 to 8 carbon atoms or from 2 to 6 carbon atoms, and useful polyol ethers may have from 3 to 10 carbon atoms, for example, from 3 to 8 carbon atoms or from 5 to 8 carbon atoms. Exemplary useful polyols include ethylene glycol, propylene glycol, poly(propylene glycol), 1,3-propanediol, trimethylolpropane, glycerol, pentaerythritol, and 1,8-octanediol.

As used herein in referring to the fluid, the term "polyol ether" refers to an organic molecule consisting of C, H, and O atoms connected one to another by C—H, C—C, C—O, O—H single bonds, and which is at least theoretically derivable by at least partial etherification of a polyol. Exemplary useful polyol ethers include diethylene glycol monomethyl ether, ethylene glycol monobutyl ether, dipropylene glycol monomethyl ether, and glycol ethers available from Dow Chemical Co., Midland, Mich., under the trade designation "DOWANOL". The polyol and/or polyol ether may have a normal boiling point of less than 450° F. (232° C.); for example, to facilitate removal of the polyol and/or polyol ether from a well after treatment.

In some embodiments, the polyol or polyol ether is at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether.

In some embodiments, the fluid further comprises at least one monohydroxy alcohol, ether, and/or ketone that may have up to (and including) 4 carbon atoms. It is recognized that, by definition, ethers must have at least 2 carbon atoms, and ketones must have at least 3 carbon atoms.

As used herein in referring to the fluid, the term "monohydroxy alcohol" refers to an organic molecule formed entirely of C, H, and O atoms connected one to another by C—H, C—C, C—O, O—H single bonds, and having exactly one C—O—H group. Exemplary monohydroxy alcohols having from 1 to 4 carbon atoms include methanol, ethanol, n-propanol, isopropanol, 1-butanol, 2-butanol, isobutanol, and t-butanol.

As used herein in referring to the fluid, the term "ether" refers to an organic molecule formed entirely of C, H, and O atoms connected one to another by C—H, C—C, C—O, O—H single bonds, and having at least one C—O—C group. Exemplary ethers having from 2 to 4 carbon atoms include diethyl ether, ethylene glycol methyl ether, tetrahydrofuran, p-dioxane, and ethylene glycol dimethyl ether.

As used herein in referring to the fluid, the term "ketone" refers to an organic molecule formed entirely of C, H, and O atoms connected one to another by C—H, C—C, C—O single bonds and C=O double bonds, and having at least one C—C(=O)—C group. Exemplary ketones having from 3 to 4 carbon atoms include acetone, 1-methoxy-2-propanone, and 2-butanone.

The fluid may be, for example, capable of at least one of solubilizing or displacing condensate in the formation. In some embodiments, methods according to the present invention are typically useful for treating hydrocarbon-bearing formations containing condensate. In some embodiments, the hydrocarbon-formation is essentially free of condensate (i.e., does not have condensate banking that affects the productivity of the formation).

The effectiveness of fluids described herein for improving the hydrocarbon productivity of a particular formation having brine (and optionally condensate) therein will typically be determined by the ability of the fluid to dissolve the quantity of brine (and optionally condensate) present in the formation. Hence, at a given temperature greater amounts of fluid having lower brine (and/or condensate) solubility (i.e., compositions that can dissolve a relatively lower amount of brine and/or condensate) will typically be needed than in the case of fluid having higher brine (and/or condensate) solubility.

In some embodiments, fluids useful in practicing the present invention may further include water (e.g., in the fluid). In some embodiments, fluids according to the present invention are essentially free of water (i.e., contains less than 0.1 percent by weight of water based on the total weight of the composition).

Methods according to the present invention may be useful, for example, for recovering hydrocarbons (e.g., at least one of methane, ethane, propane, butane, hexane, heptane, or octane) from hydrocarbon-bearing subterranean clastic formations (in some embodiments, predominantly sandstone) or from hydrocarbon-bearing subterranean non-clastic formations (in some embodiments, predominantly limestone). In some embodiments, the hydrocarbon-bearing formation comprises at least one of shale, conglomerate, diatomite, sand or sandstone.

Referring to FIG. 1, an exemplary offshore oil and gas platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

Also shown in FIG. 2, a treatment zone is depicted next to casing 34, cement 36 within perforation 50. In the expanded view, fracture 57 is shown in which proppant 60 has been added. Fracture 57 is shown in relation to "crushed zone" 62 and regions surrounding wellbore 32 region showing virgin hydrocarbon-bearing formation 14. Damaged zone 64 has a lower permeability and is shown between virgin hydrocarbon formation 14 and casing 34.

While the drawing depicts an offshore operation, the skilled artisan will recognize that the compositions and methods for treating a production zone of a wellbore may also be suitable for use in onshore operations. Also, while the drawing depicts a vertical well, the skilled artisan will also recognize that methods of the present invention may also be useful, for example, for use in deviated wells, inclined wells or horizontal wells.

Figure 3:
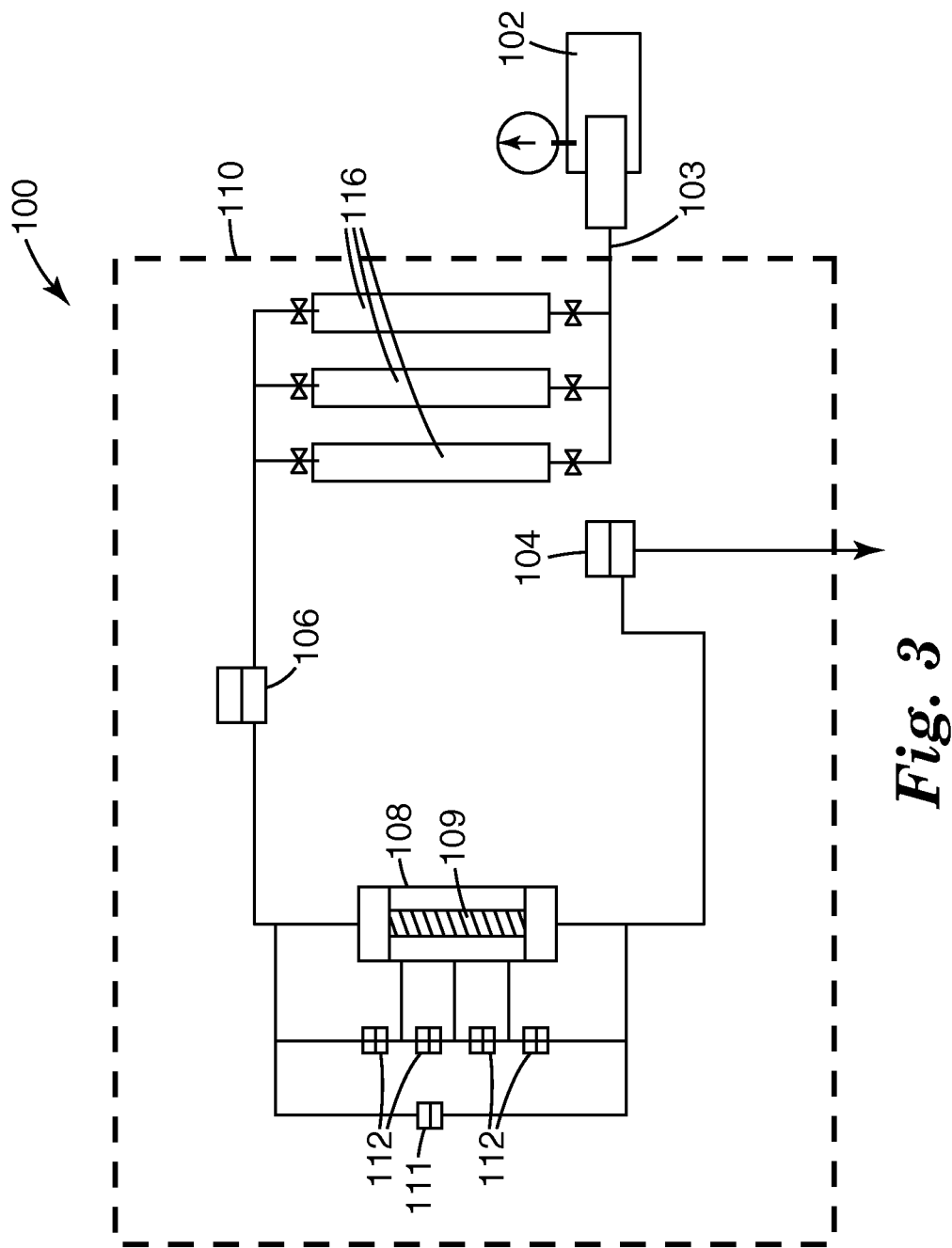
FIG. 3 is a schematic illustration of the core flood set-up for testing cores samples and other materials using the compositions and methods of the present invention.

A schematic diagram of core flood apparatus 100 used to determine relative permeability of the substrate sample is shown in FIG. 3. Core flood apparatus 100 included positive displacement pumps (Model No. 1458; obtained from General Electric Sensing, Billerica, Mass.) 102 to inject fluid 103 at constant rate in to fluid accumulators 116. Multiple pressure ports 112 on core holder 108 were used to measure pressure drop across four sections (2 inches (5.1 cm) in length each) of core 109. Pressure port 111 was used to measure the pressure drop across the whole core. Two back-pressure regulators (Model No. BPR-50; obtained from Temco, Tulsa, Okla.) 104, 106 were used to control the flowing pressure downstream and upstream, respectively, of core 109. The flow of fluid was through a vertical core to avoid gravity segregation of the gas. High-pressure core holder (Hassler-type Model UTPT-1x8-3K-13 obtained from Phoenix, Houston, Tex.) 108, back-pressure regulators 106, fluid accumulators 116, and tubing were placed inside pressure-temperature-controlled oven (Model DC 1406F; maximum temperature rating of 650° F. (343° C.) obtained from SPX Corporation, Williamsport, Pa.) at the temperatures tested.

Typically, it is believed to be desirable to allow for a shut-in time after hydrocarbon-bearing formations are contacted with the fluids described herein to allow for mixing (e.g., turbulent mixing). Exemplary set in times include a few hours (e.g., 1 to 12 hours), about 24 hours, or even a few (e.g., 2 to 10) days.

The skilled artisan, after reviewing the instant disclosure, will recognize that various factors may be taken into account in practice of the present invention including, for example, the ionic strength of the composition, pH (e.g., a range from a pH of about 4 to about 10), and the radial stress at the wellbore (e.g., about 1 bar (100 kPa) to about 1000 bars (100 MPa)).

Typically, after treatment according to the present invention hydrocarbons are then obtained from the wellbore at an increased rate, as compared the rate prior to treatment. In some embodiments wherein the formation has at least one fracture, the fracture has at least one first conductivity prior to contacting the fracture with the composition and at least one second conductivity after contacting the fracture with the composition, and wherein the second conductivity is at least 5 (in some embodiments, 10, 20, 30, 40, 50, 60, 70, 80, 90, 100, 110, 120, 130, 140, or even 150) percent higher than the first conductivity.

Methods according to the present invention may be practiced, for example, in a laboratory environment (e.g., on a core sample (i.e., a portion) of a hydrocarbon-bearing formation) or in the field (e.g., on a subterranean hydrocarbon-bearing formation situated downhole in a well). Typically, methods according to the present invention are applicable to downhole conditions having a pressure in a range of from about 1 bar (100 kPa) to about 1000 bars (100 MPa) and a temperature in a range from about 100° F. (37.8° C.) to 400° F. (204° C.), although they may also be useful to treat hydrocarbon-bearing formations under other conditions.

In addition to brine and/or condensate, other materials (e.g., asphaltene or water) may be present in the hydrocarbon-bearing formation. Methods according to the present invention may also be useful in those cases.

Various methods (e.g., pumping under pressure) known to those skilled in the oil and gas art can be used in accordance with the present invention to contacting the hydrocarbon-bearing subterranean formations with fluid. Coil tubing, for example, may be used to deliver the fluid to a particular zone in the formation. In some embodiments, in practicing the present invention it may be desirable to isolate a particular zone (e.g., with conventional packers) to be contacted with the fluid.

Advantages and embodiments of this invention are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight.

EXAMPLE 1

A nonionic fluorinated polymeric surfactant ("Nonionic Fluorinated Polymeric Surfactant A") was prepared essentially as in Example 4 of U.S. Pat. No. 6,664,354 (Savu), except using 15.6 grams (g) of 50/50 mineral spirits/organic peroxide initiator (tert-butyl peroxy-2-ethylhexanoate obtained from Akzo Nobel, Arnhem, The Netherlands under the trade designation "TRIGONOX-21-C50") in place of 2,2'-azobisisobutyronitrile, and with 9.9 grams of 1-methyl-2-pyrrolidinone added to the charges.

A core with the dimensions specified below was cut from a source rock block. The core was dried in an oven at 100° C. for 24 hours and then was weighed. The core was then wrapped with polytetrafluoroethylene (PTFE), aluminum foil and shrink wrapped with heat shrink tubing (obtained under the trade designation "TEFLON HEAT SHRINK TUBING" from Zeus, Inc., Orangeburg, S.C.). The wrapped core was placed into a core holder inside the oven at the experimental temperature.

A core flooding procedure was carried out on a sandstone core by introducing gas and condensate fluids followed by water. The procedure was performed using a Berea sandstone core at a reservoir temperature of 175° F. (79.4° C.).

The initial gas permeability was measured using nitrogen at 75° F. (23.9° C.). The initial brine saturation of 19% was established by injecting a measured volume of brine into the vacuumed core. The gas relative permeability at initial water saturation was measured using nitrogen at 75° F. (23.9° C.). Table 1 (below) summarizes the properties of the core and the conditions.

A synthetic hydrocarbon mixture was prepared that exhibits retrograde gas condensate behavior. Table 2 (below) gives the composition of the synthetic gas mixture. A two-phase flood with the fluid state mixture was done using the dynamic flashing method, which is also known as the pseudo-steady method, by flashing the fluid through the upstream back-pressure regulator set above the dew point pressure at 5100 psig (35.2 MPa) to the core pressure set below the dew point pressure by the downstream back-pressure regulator. This procedure was done at a core pressure of 420 psig (2.9 MPa). Table 3 (below) summarizes the results for the pre-treatment two-phase flow.

The core was then treated with 18 pore volumes of the composition given in Table 4 (below) and then shut-in for 15 hours. The steady state two-phase flow of gas and condensate was then done under the same conditions as the pre-treatment two-phase flow. Table 3 (below) summarizes the results for the post-treatment two-phase flow. The results show that the chemical treatment increased the gas and condensate relative permeability by a factor of about 1.9.

Next two pore volumes of three-phase gas, condensate and brine at a fractional flow of brine equal to 0.038 was injected to test the effect of mobile water on the treatment. This was followed with a fluid flush (composition given in Table 5 (below)) to remove the brine from the core and finally with the two-phase flow of the same gas condensate fluid mixture (Condensate Flood-3). Table 3 (below) summarizes the results for Condensate Flood-3. The improvement factor was found to be about 2. Although not wanting to be bound by theory, it is believed these results show that if a gas bearing zone were, for example, invaded by mobile water due to cross flow through the wellbore from a deeper water bearing zone penetrated by the same well, the resulting damage due to water blocking could be completely reversed by solvent injection into the treated gas zone.

A similar but more severe test of the water blocking damage caused by mobile water was done by next injecting 1 pore volumes of 100% brine into the same core. The core was then flooded with the fluid described in Table 5 (below) to flush out the brine and then again with the same two-phase gas condensate fluid mixture until steady state flow of gas and condensate was established (Condensate Flood-4). Table 3 (below) summarizes the results for Condensate Flood-4. The improvement factor at this time was about 1.9.

TABLE 1

| Core | Berea Sandstone |
|---|---|
| Length, inches (cm) | 8 |
| Diameter, inches (cm) | 1 (2.54) |
| Porosity, % | 20 |
| Pore volume, cc | 20.6 |
| Swi, % | 19 |
| Temperature, ° F. (° C.) | 175 (79.4) |
| k, md | 217 |

TABLE 2

| Component | Mole % |
|---|---|
| Methane | 89 |
| n-Butane | 5.0 |
| n-Heptane | 2.5 |
| n-Decane | 2.5 |
| n-Pentadecane | 1 |

TABLE 3

| | $k_{rg}$ | $k_{ro}$ | Improvement Factor |
|---|---|---|---|
| Pre-Treatment 2-phase flow | 0.065 | 0.025 | n/a |
| Post-Treatment 2-phase flow | 0.123 | 0.047 | 1.88 |
| Condensate flood-3 | 0.134 | 0.052 | 2.05 |
| Condensate flood-4 | 0.121 | 0.047 | 1.86 |

TABLE 4

| Component | wt % |
|---|---|
| Nonionic Fluorinated Polymeric Surfactant A | 2 |
| 2-Butoxyethanol | 69 |
| Ethanol | 29 |

TABLE 5

| Component | wt % |
|---|---|
| 2-Butoxyethanol | 70 |
| Ethanol | 30 |

EXAMPLE 2

Compatibility Tests. A procedure was carried out to determine the amount for each brine in Table 6 (below) that in which the fluid solubilized at the various ratios. 3.0 grams of fluid containing propylene glycol (PG) and isopropanol (IPA) at the ratios (Brine 1-2) shown in Table 7 (below) were used. At 137° C. brines were added in 0.3 grams amounts to reach the insolubility points (i.e., to determine when salt precipitate (ppt) or cloudiness was observed). The results are shown in Table 7 and Table 8, below.

TABLE 6

| Brine | % solid | % NaCl | % CaCl |
|---|---|---|---|
| 1 | 21.7 | 16.5 | 5.2 |
| 2 | 21.7 | 20.63 | 1.34 |

TABLE 6-continued

| Brine | % solid | % NaCl | % CaCl |
|---|---|---|---|
| 3 | 24.3 | 22.8 | 1.5 |
| 4 | 24.3 | 18.48 | 5.82 |

TABLE 7

| | Brine 1 | | | Brine 2 | | |
|---|---|---|---|---|---|---|
| PG/IPA | low limit % | upper limit % | ppt/cloudy | low limit % | upper limit % | ppt/cloudy |
| 70/30 | 28.6 | 30.2 | Ppt | 11.8 | 14.3 | ppt |
| 80/20 | 50.0 | — | — | 23.1 | 25.0 | ppt |
| 90/10 | 50.0 | — | — | 38.8 | 40.0 | ppt |
| 100/0 | 50.0 | — | — | 50.0 | — | — |

TABLE 8

| | Brine 3 | | | Brine 4 | | |
|---|---|---|---|---|---|---|
| PG/IPA | low limit % | upper limit % | ppt/cloudy | low limit % | upper limit % | ppt/cloudy |
| 70/30 | 6.3 | 9.1 | Ppt | 16.7 | 18.9 | ppt |
| 80/20 | 6.3 | 9.1 | Ppt | 28.6 | 30.2 | ppt |
| 90/10 | 9.1 | 11.8 | Ppt | 50.0 | — | — |
| 100/0 | 14.3 | 16.7 | Ppt | 50.0 | — | — |

This compatibility information can be used to select a treatment fluid for a hydrocarbon-bearing formation having a brine composition similar to Brine 1, 2, 3, or 4.

EXAMPLE 3

3.0 grams of fluid containing 70% by weight propylene glycol (PG) and 30% by weight isopropanol (IPA) were used. Brine containing 18% by weight sodium chloride in water was added in 0.25 grams amounts at 160° C. until 3.0 grams had been added. No salt precipitation was observed. Based on this compatibility information, a fluid containing about 70/30 PG/IPA can be used to treat a hydrocarbon-bearing formation saturated with 50% brine containing 18% by weight sodium chloride.

In comparison, when the procedure was carried out by adding 0.25 grams of the brine to methanol at 160° C., precipitation occurred.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

What is claimed is:

1. A method of treating a hydrocarbon-bearing formation having at least one first gas permeability, the method comprising:
    injecting a fluid into the hydrocarbon-bearing formation, wherein the fluid comprises at least one material from at least two of Group I, Group II, or Group III, wherein:
        Group I is a polyol or polyol ether, wherein the polyol has from 2 to 25 carbon atoms, and wherein the polyol ether has from 3 to 8 carbon atoms;
        Group II is a monohydroxy alcohol, ether, or ketone, wherein the monohydroxy alcohol, ether, and ketone independently have from 1 to 4 carbon atoms; and
        Group III is toluene, diesel, heptane, octane, or condensate,
    wherein the fluid at least one of solubilizes or displaces at least one of brine or condensate in the hydrocarbon-bearing formation, wherein the fluid is free of nonionic polymeric surfactant comprising perfluoroalkylsulfonamido groups, wherein any surfactant that may be present in the fluid is below its critical micelle concentration, wherein the hydrocarbon-bearing formation has at least one second gas permeability after injecting the fluid into the formation, and wherein the second gas permeability is at least 5 percent higher than the first gas permeability.

2. The method of claim 1, wherein the first gas permeability and the second gas permeability are gas relative permeabilities.

3. The method of claim 1, wherein the fluid comprises at least one of the polyol or polyol ether.

4. The method of claim 1, wherein the polyol or polyol ether is at least one of 2-butoxyethanol, ethylene glycol, propylene glycol, polypropylene glycol), 1,3-propanediol, 1,8-octanediol, diethylene glycol monomethyl ether, or dipropylene glycol monomethyl ether.

5. The method of claim 1, wherein the fluid comprises at least one monohydroxy alcohol, ether, or ketone, wherein the monohydroxy alcohol, ether, or ketone independently have from 1 to 4 carbon atoms.

6. The method of claim 1, wherein the fluid comprises at least one of ethanol or isopropanol.

7. The method of claim 1, wherein the fluid at least partially solubilizes brine in the hydrocarbon-bearing formation.

8. The method of claim 1, wherein the second gas permeability is at least 10 percent higher than the first gas permeability.

9. The method of claim 1, further comprising obtaining hydrocarbons from a well bore penetrating the hydrocarbon-bearing formation after injecting the fluid.

10. The method of claim 1, wherein the fluid is free of organosilicon compounds.

11. A method of treating a hydrocarbon-bearing formation, the method comprising contacting the hydrocarbon-bearing formation with a fluid, wherein the fluid comprises:

at least one of a polyol or polyol ether, wherein the polyol has from 2 to 25 carbon atoms, and wherein the polyol ether has from 3 to 8 carbon atoms; and at least one of a monohydroxy alcohol, ether, or ketone, wherein the monohydroxy alcohol, ether, and ketone independently have from 1 to 4 carbon atoms, wherein the fluid is free of nonionic polymeric surfactant comprising perfluoroalkylsulfonamido groups, wherein the at least one of a polyol or polyol ether is present in the fluid at at least 50 weight percent, based on the total weight of the fluid, wherein the hydrocarbon-bearing formation has at least one first gas permeability prior to contacting the hydrocarbon-bearing formation with the fluid and at least one second gas permeability after contacting the hydrocarbon-bearing formation with the fluid, and wherein the second gas permeability is at least 5 percent higher than the first gas permeability.

12. The method of claim 11, wherein the first gas permeability and the second gas permeability are gas relative permeabilities.

13. The method of claim 11, wherein the fluid further comprises at least one of toluene, diesel, heptane, octane, or condensate.

14. The method of claim 11, wherein the polyol or polyol ether is at least one of 2-butoxyethanol, ethylene glycol, propylene glycol, polypropylene glycol), 1,3-propanediol, 1,8-octanediol, diethylene glycol monomethyl ether, or dipropylene glycol monomethyl ether.

15. The method of claim 11, wherein the hydrocarbon-bearing formation has at least one fracture, wherein the fracture has a plurality of proppants therein, the method further comprising contacting the fracture with the fluid.

16. The method of claim 11, wherein the fluid is free of organosilicon compounds.

17. The method of claim 11, wherein the hydrocarbon-bearing formation has brine and at least one temperature, the brine having at least one composition, the method further comprising:

obtaining compatibility information for at least one model brine and at least one model fluid at at least one model temperature, wherein each model brine independently has a composition selected at least partially based on the formation brine composition, wherein each model temperature is independently selected at least partially based on the formation temperature, and wherein each model fluid independently comprises:

at least one of a polyol or polyol ether, wherein the polyol has from 2 to 25 carbon atoms, and wherein the polyol ether has from 3 to 8; and at least one of a monohydroxy alcohol, ether, or ketone, wherein the monohydroxy alcohol, ether, and ketone independently have from 1 to 4 carbon atoms; and selecting a treatment fluid for treating the hydrocarbon-bearing subterranean formation based at least partially on the compatibility information, wherein the treatment fluid is free of nonionic polymeric surfactant comprising perfluoroalkylsulfonamido groups, and wherein any surfactant that may be present in the fluid is below its critical micelle concentration.

18. The method of claim 17, wherein the first gas permeability and the second gas permeability are gas relative permeabilities.

19. The method of claim 17, wherein the treatment fluid has the same composition as the at least one model fluid.

\* \* \* \* \*